(12) United States Patent
Wang et al.

(10) Patent No.: US 11,052,354 B2
(45) Date of Patent: Jul. 6, 2021

(54) REVERSE OSMOSIS MEMBRANE AND METHOD OF USE

(71) Applicant: MONASH UNIVERSITY, Clayton (AU)

(72) Inventors: Huanting Wang, Clayton (AU); Seungju Kim, Clayton (AU)

(73) Assignee: MONASH UNIVERSITY, Clayton (AU)

( * ) Notice: Subject to any disclaimer, the term of this patent is extended or adjusted under 35 U.S.C. 154(b) by 28 days.

(21) Appl. No.: 16/472,139

(22) PCT Filed: Dec. 14, 2017

(86) PCT No.: PCT/AU2017/000274
§ 371 (c)(1),
(2) Date: Jun. 20, 2019

(87) PCT Pub. No.: WO2018/112499
PCT Pub. Date: Jun. 28, 2018

(65) Prior Publication Data
US 2019/0314770 A1    Oct. 17, 2019

(30) Foreign Application Priority Data

Dec. 20, 2016 (AU) ................................ 2016905264

(51) Int. Cl.
*B01D 71/02* (2006.01)
*B01D 61/02* (2006.01)
(Continued)

(52) U.S. Cl.
CPC ......... *B01D 71/021* (2013.01); *B01D 61/025* (2013.01); *B01D 67/0079* (2013.01);
(Continued)

(58) Field of Classification Search
CPC ............. B01D 2323/30; B01D 61/025; B01D 67/0079; B01D 69/12; B01D 69/125;
(Continued)

(56) References Cited

U.S. PATENT DOCUMENTS 8,231,013 B2    7/2012 Chu et al.
9,902,141 B2 *  2/2018 Mi ................... B01D 69/10
(Continued)

FOREIGN PATENT DOCUMENTS

CN      107551834 A    1/2018

OTHER PUBLICATIONS

Wang, H. et al., "Polyamide thin-film composite membranes prepared from a novel triamine 3,5-diamino-N-(4-aminophenyl)-benzamide monomer and m-phenylenediamine," Journal of Membrane Science, vol. 353, No. 1-2, May 1, 2010, Available Online Feb. 18, 2010, 7 pages.

(Continued)

*Primary Examiner* — Ana M Fortuna
(74) *Attorney, Agent, or Firm* — McCoy Russell LLP

(57) ABSTRACT

The invention relates to a membrane, and method of manufacture of a membrane for reverse osmosis having a porous substrate, and a layer adjacent the porous substrate comprising a two dimensional nanosheet material and cross-linked polymer. The two dimensional nanosheet material is preferably chosen from the group comprising graphene oxide including reduced graphene oxide, holey graphene, holey graphene oxide, laminated graphene oxide and holey reduced graphene oxide.

16 Claims, 9 Drawing Sheets

(51) Int. Cl.
| | |
|---|---|
| *B01D 67/00* | (2006.01) |
| *B01D 69/12* | (2006.01) |
| *B01D 71/40* | (2006.01) |
| *C02F 1/44* | (2006.01) |
| *C02F 103/08* | (2006.01) |

(52) U.S. Cl.
CPC ............ *B01D 69/125* (2013.01); *B01D 71/40* (2013.01); *C02F 1/441* (2013.01); *B01D 2323/30* (2013.01); *C02F 2103/08* (2013.01)

(58) Field of Classification Search
CPC ....... B01D 71/021; B01D 71/40; B01D 71/68; C02F 1/441; C02F 2103/08
See application file for complete search history.

(56) References Cited

U.S. PATENT DOCUMENTS

| | | | | |
|---|---|---|---|---|
| 10,112,150 | B2* | 10/2018 | Chu | ............... B01D 71/40 |
| 10,239,302 | B2* | 3/2019 | Mi | ............... C01B 32/23 |
| 10,272,392 | B2* | 4/2019 | Chu | ............... B01D 69/12 |
| 2010/0062156 | A1 | 3/2010 | Kurth et al. | |
| 2014/0227548 | A1* | 8/2014 | Myrick | ............... C10L 1/28 428/570 |
| 2015/0298115 | A1* | 10/2015 | Campidelli | ............... B01J 37/04 424/9.362 |
| 2016/0067654 | A1* | 3/2016 | Zhang | ............... B01D 69/125 521/27 |
| 2016/0303518 | A1 | 10/2016 | Bano et al. | |
| 2016/0354729 | A1 | 12/2016 | Krishna et al. | |
| 2017/0157570 | A1* | 6/2017 | Chu | ............... B01D 69/12 |
| 2018/0141008 | A1* | 5/2018 | Prince | ............... B01D 71/78 |
| 2019/0120701 | A1* | 4/2019 | Neella | ............... C01B 32/192 |
| 2019/0351374 | A1* | 11/2019 | Kumar | ............... B01D 67/0006 |

OTHER PUBLICATIONS

Han, Y. et al., "Ultrathin Graphene Nanofiltration Membrane for Water Purification," Advanced Functional Materials, vol. 23, No. 29, Aug. 7, 2013, Available Online Feb. 26, 2013, 8 pages.

Choi, W. et al., "Layer-by-Layer Assembly of Graphene Oxide Nanosheets on Polyamide Membranes for Durable Reverse-Osmosis Applications," ACE Applied Materials & Interfaces, vol. 5, No. 23, Dec. 11, 2013, Available Online Nov. 21, 2013, 10 pages.

Gai, J. et al., "An ultrafast water transport forward osmosis membrane: porous graphene," Journal of Materials Chemistry A, vol. 2, No. 11, Mar. 21, 2014, Available Online Dec. 9, 2013, 6 pages.

Joshi, R. et al., "Precise and Ultrafast Molecular Sieving Through Graphene Oxide Membranes," Science, vol. 343, No. 6172, Feb. 14, 2014, 22 pages.

Moon, J. et al., "Polyamide-POSS hybrid membranes for seawater desalination: Effect of POSS inclusion on membrane properties," Journal of Membrane Science, vol. 461, Jul. 1, 2014, Available Online Mar. 12, 2014, 7 pages.

Liu, H. et al., "Facile Fabrication of Freestanding Ultrathin Reduced Graphene Oxide Membranes for Water Purification," Advanced Materials, vol. 27, No. 2, Jan. 14, 2015, Published Online Nov. 18, 2014, 6 pages.

Duan, J. et al., "High-performance polyamide thin-film-nanocomposite reverse osmosis membranes containing hydrophobic zeolitic imidazolate framework-8," Journal of Membrane Science, vol. 476, Feb. 15, 2015, Available Online Nov. 29, 2014, 8 pages.

Chae, H. et al., "Graphene oxide-embedded thin-film composite reverse osmosis membrane with high flux, anti-biofouling, and chlorine resistance," Journal of Membrane Science, vol. 483, Jun. 1, 2015, Available Online Mar. 10, 2015, 8 pages.

Shen, J. et al., "Membranes with Fast and Selective Gas-Transport Channels of Laminar Graphene Oxide for Efficient CO2 Capture," Angewandte Chemie International Edition, vol. 127, No. 2, Jan. 7, 2015, Available Online Nov. 5, 2014, 5 pages.

Yin, J. et al., "Graphene oxide (GO) enhanced polyamide (PA) thin-film nanocomposite (TFN) membrane for water purification," Desalination, vol. 379, Feb. 1, 2016, Available Online Nov. 18, 2015, 9 pages.

Lee, T. et al., "Highly porous carbon nanotube/polysulfone nanocomposite supports for high-flux polyamide reverse osmosis membranes," Journal of Membrane Science, vol. 539, Oct. 1, 2017, Available Online Jun. 13, 2017, 10 pages.

ISA Australian Patent Office, International Search Report Issued in Application No. PCT/AU2017/000274, dated Mar. 22, 2018, WIPO, 5 pages.

\* cited by examiner

REVERSE OSMOSIS MEMBRANE AND METHOD OF USE

CROSS-REFERENCE TO RELATED APPLICATIONS

The present application is a U.S. National Phase of International Patent Application Serial No. PCT/AU2017/000274 entitled "REVERSE OSMOSIS MEMBRANE AND METHOD OF USE," filed on Dec. 14, 2017. International Patent Application Serial No. PCT/AU2017/000274 claims priority to Australian Patent Application No. 2016905264 filed on Dec. 20, 2016. The entire contents of each of the above-referenced applications are hereby incorporated by reference for all purposes.

FIELD OF INVENTION

The present invention relates to the field of membrane technology.

In one form, the invention relates to a graphene based membrane and method of manufacturing same. In a particularly preferred form the invention relates to a membrane comprising a two dimensional nanosheet material, such as graphene oxide (GO) and polymer membrane.

In one particular aspect the present invention is suitable for use as a membrane for desalination and water purification.

It will be convenient to hereinafter describe the invention in relation to desalination, however it should be appreciated that the present invention is not limited to that use only and other applications will be readily apparent to the person skilled in the art.

BACKGROUND ART

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

The rising worldwide demand for clean water for human consumption and industry has driven an ongoing need for efficient technologies to convert seawater and brackish water to potable water. Membrane-based separation is a simple and effective method used in many industrial separation applications such as water purification and desalination because of its energy saving potential, easy scale-up and low cost. In particular, water desalination and purification by the reverse osmosis process has dominated over 60% desalination capacity in the world and the osmotic pressure-driven processes such as forward osmosis and pressure-retarded osmosis have developed as a potential alternative to reverse osmosis in wastewater treatment, seawater desalination, and energy production.

Put simply, reverse osmosis (RO) is a process which uses filtration membranes to remove dissolved inorganic solids (such as salts), and contaminants such as suspended particles, heavy metals and ions are removed from contaminated wastewater or groundwater to produce potable water. A typical pressure driven RO process generates fresh water from salt water by applying an external hydraulic pressure greater than the osmotic pressure of the salt water. By contrast forward or direct osmosis (FO) relies on the contaminated feed solution passing through a semipermeable membrane towards a draw solution solely on the difference in the chemical potential (concentration) of the two solutions. The salts in the feed stream could be exchanged for an osmotic agent specifically chosen for its ease of removal, such as by precipitation. The potable water them may be separated.

Polyamide (PA) and cellulose triacetate (CTA) have been the main membrane materials for membrane desalination. Polyamide membranes have high water flux and high salt rejection, and are commonly used in reverse osmosis or nanofiltration in water desalination processes. However, the major drawback of polyamide membranes is their poor stability against oxidizing agents such as chlorine which is commonly used in water desalination and purification to kill microorganisms and minimize membrane bio-fouling. In industrial membrane desalination processes, the feed water often has to be dechlorinated before being passed through reverse osmosis membrane modules for desalination. The water is finally rechlorinated to maintain its freshness and be sent to water supply network. Hence, the poor oxidation stability of polyamide membrane leads to extra dechlorination-rechlorination steps and adds significant costs in water industry. Therefore, the development of chlorine-resistant osmosis membrane is of significant interest for various industries involving desalination processes in terms of reducing the membrane process complexity and the costs of water processing.

In addition, RO processes are usually operated at high pressure to overcome the osmotic pressure of saline water and ensure high flux, but this leads to compaction of the PA membrane layer, which results in a reduction in water permeability and membrane lifetime for long-term operations.

Graphene-based materials have been of great interest for many potential membrane-based separation applications such as ion separation, gas separation, water purification and desalination. (Joshi et al, *Science* 343(6172) (2014) 752-754; Liu et al, *Adv. Mater.* 27(2) (2015) 249-254.; Han et al, *Adv. Funct. Mater.* 23(29) (2013) 3693-3700; Choi et al, *ACS Appl. Mater. Interfaces* 5(23) (2013) 12510-12519.)

In recent years there have been efforts to develop graphene-based membranes from holey graphene nanosheets, GO or reduced GO laminates. Because of its atomic thickness, robustness and potential for functionalisation, graphene and its derivatives have been considered as attractive building blocks to construct high-performance separation membranes.

As individual graphene nanosheets are known to be inherently impermeable to all molecules, graphene-based membranes are mainly fabricated by producing either nanoporous graphene (also known as holey graphene) or GO/reduced GO laminates. Molecular dynamics simulation studies have showed that porous graphene has great potential for water desalination (Gai et al, *Mater. Chem. A* 2014, 2, 4023-4028) and a number of techniques such as chemical oxidation or air oxidation have been developed to prepare holey graphene, but the large-scale and cost-effective fabrication of such holey graphene-based ultrathin membranes with desired salt rejection remains a great challenge.

By contrast, GO or reduced GO laminate membranes can be easily prepared by filtration or coating of GO nanosheet suspensions.

It is well known that the mass transport through GO/reduced GO membranes mainly relies on interlayered nanochannels. (Shen et al, *Angew. Chem. Int. Edit.*, 2015, 127, 588-592). When GO laminate membranes are immersed in water and become hydrated, they show excellent ionic sieving properties for small hydrated ions such as K+, $AsO_4^{3-}$, or $Mg^{2+}$. Graphene oxide/reduced GO membranes also perform nanofiltration membranes, showing good rejection of dye molecules. By incorporating hydrophilic thermoresponsive polymer into GO interlayers, the resulting GO nanocomposite membrane shows temperature-responsive changes in water flux and rejection in the nanofiltration processes.

GO laminates have also been assembled on polyamide surfaces with physical interaction and chemical reaction such as via poly(tannic acid) crosslinking to enhance antimicrobial effect and slow down polyamide degradation by oxidizing agent in water treatment processes. GO/reduced GO GO/reduced GO laminate membranes and their polymer composite membranes have a potential to apply for desalination processes.

The remarkable separation properties of GO/reduced GO laminate membranes could bring high water flux and salt rejection for desalination process. Moreover, chemically stable GO could be beneficial in the chlorine degradation issues of commercially available and widely used cellulose triacetate and polyamide membranes in water treatment processes. However, GO/reduced GO laminate membranes and their polymer composite membranes reported so far have either low salt rejection or poor structural stability and mechanical strength, and thus they are not suitable for practical desalination applications. More importantly, structural weakness of GO/reduced GO membranes in aqueous conditions would bring difficulty of long-term water treatment operations.

Immobilization of GO by chemical reaction with polymer or organic molecules has been studied for nanofiltration and seawater desalination to improve performance of GO membranes. The GO/reduced GO membranes reported so far are prepared by simple and facile vacuum assisted filtration method from an aqueous solution, however, ultrathin GO/reduced GO membranes are easily re-dispersed into water during water-based operations. As a result, problems arise in respect of controlling interlayer distance and reducing selective layer thickness for practical industrial applications using GO/reduced GO membranes.

For example, US patent application 2016/0303518 describes graphene based membranes for ultrafiltration applications, however these membranes cannot be used for reverse osmotic applications due to their pore system, which includes larger pores and thus shows high flux. Ultrafiltration typically uses a pore size range of 0.1 micron to 0.01 micron compared to a pore size range of 0.0001 micron to 0.001 micron. The small pore size of reverse osmosis membranes means that to force filtration they require significantly higher osmotic pressure than ultrafiltration membranes.

Chinese patent application No. CN201610511299.6 discloses the use of graphene based membranes for forward osmosis applications using a microfiltration scale porous substrate. Microfiltration scale substrate typically has a pore size range from 0.1 micron to 5 micron, which is significantly larger than an ultrafiltration scale porous substrate used for reverse osmosis membranes. This means the requirement and fabrication process for reverse osmosis membrane are very different from those for forward osmosis membrane.

An ideal reverse osmosis membrane would possess high water flux, high salt rejection, resistance to fouling, chemical stability, and other desirable characteristics such as mechanical and thermal stability. These characteristics are mostly determined by intrinsic structure and chemistry of the membranes.

SUMMARY OF INVENTION

An object of the present invention is to provide a filtration membrane suitable for reverse osmosis having improved process performance.

Another object of the present invention is to provide a process using a filtration membrane having reduced energy consumption.

A further object of the present invention is to provide a filtration membrane which resists fouling.

A further object of the present invention is to alleviate at least one disadvantage associated with the related art.

It is an object of the embodiments described herein to overcome or alleviate at least one of the above noted drawbacks of related art systems or to at least provide a useful alternative to related art systems.

In a first aspect of embodiments described herein there is provided a membrane for reverse osmosis comprising:
(i) a porous substrate, and
(ii) a layer adjacent the porous substrate and comprising a two dimensional nanosheet material and cross-linked polymer.

Typically, the asymmetrically porous substrate has a pore size range of 2 nm to 100 nm. Particularly preferred substrates are based on poly(ether sulphone) (PES) or polysulphone (PS) which typically have an amorphous structure.

Typically, the two dimensional nanosheet material is graphene. Graphene is an allotrope of carbon consisting of a single layer of carbon atoms arrange din a hexagonal lattice and is the structural element of many other allotropes of carbon such as graphite, charcoal and carbon nanotubes. Graphite can be oxidised using strong oxidising agents to introduce oxygen functionalities which expand the layer separation and make the material readily dispersed in water and organic solvents. Graphite oxide disperses in basic solutions to yield monomolecular sheets known graphene oxide (GO) by analogy to graphene, the single layer form of graphite.

For example, the two dimensional nanosheets is chosen from GO including reduced GO, laminated GO, holey graphene, holey GO and holey reduced GO. Preferably the graphene is in the form of single layer or multi-layer nanosheets—or fibres. International application WO 2008143829 for example, describes the formation of laminated GO. Other two-dimensional nanosheets such as $MoS_2$, boron nitride and metal oxide and metal carbides can be chosen.

In a particularly preferred embodiment, the GO is in the form of a laminate, preferably a pristine GO laminate, that is, without functionalisation, crosslinking or reduction. Although pristine GO-based membranes have previously demonstrated promising molecular separation due to their well-defined interlayer spacing, their applications in water processing operations remain limited due to the natural swelling tendency of GO in the aqueous phase which decreases separation ability.

However, in the present invention, pristine GO laminate is successfully integrated into a highly cross-linked network to produce membranes with anti-swelling behaviour and excellent desalination capability. Furthermore, the two-dimensional structure with tunable functional groups on GO from the layered GO membrane, offers unique molecular transport through the interlayered nanochannels between GO laminates.

Typically, the layer is in the form of an ultrathin coating on the porous substrate. In a preferred embodiment the layer is between 1 and 500 nm, preferably between 1 and 50 nm, more preferably between 10 and 30 nm and even more preferably between 20 and 30 nm in thickness. The volume of precursor polymer solution loading strongly influences the thickness of the membrane effective layer as GO laminates stack on a substrate. The processing method (eg vacuum level applied for filtration) is also an important factor in determining the morphology of the effective layer. At high vacuum levels, the GO-polymer layer is comparatively uniform, compact and thin—all of which are advantageous characteristics for fast and selective water transport. At low vacuum levels the effective layer may be much thicker—around 500 nm.

In another aspect of embodiments described herein there is provided a method of manufacturing the membrane of the present invention including the steps of:
(i) generating the porous substrate, and subsequently
(ii) applying a solution of two dimensional nanosheet material and one or more monomers to the porous substrate,
(iii) crosslinking the monomers to form a polymer.

Typically, the solution comprises nanosheets of GO and monomers. More typically the solution comprises pristine GO laminates.

Typically the monomers are characterised by mono-functional or bifunctional terminal alkene groups with C=C double bonds such as those occurring in N-isopropylacrylamide, 3-buten-2-one, N,N-methylenebis(acrylamide), N,N-ethylenebis(acrylamide), or acrylaldehyde, 2-hydroxyethyl methacrylate and propylene glycol monoacrylate, and cross-linker triethylene glycol dimethacrylate. Typically, the mono-functional monomer forms the polymer backbone and bifunctional monomer acts as a crosslinker during polymerization. Preferably the mixture of monomers contains a high proportion of bifunctional monomers and the remaining proportion comprises monofunctional monomers, so that crosslinking produces a dense polymer network that entwines or wraps the GO nanosheets together. This combination tends to maximise mechanical strength by balancing flexibility and modulus, with the aim if creating a highly cross-linked and dense polymer network-entwined GO layer that is mechanically strong and chemically durable.

Preferably the solution of GO and polymer is applied to the porous substrate by spin coating or filtration or reduced pressure solution casting but other methods will be readily apparent to the person skilled in the art.

Spin coating application typically comprises dipping one surface of the porous substrate in the GO and polymer solution and then spin coating to create the thin layer.

Alternatively, the solution can be filtered through the porous substrate. In a particularly preferred embodiment a monomer solution is developed by vacuum filtration onto a membrane substrate.

Once the solution has been applied to the substrate, a polymer is formed by crosslinking. This can be achieved by any suitable method known in the art such as by heating, typically between 50 and 100° C. In a particularly preferred embodiment free radical polymerisation is used. The time and speed of the spin coating can be controlled to obtain the desired layer thickness.

The application and polymerisation steps can be repeated to ensure a substantially defect free GO and polymer layer.

The membrane of the present invention is suitable for filtration. In yet a further aspect of embodiments described herein there is provided a method of filtration comprising the step of passing a fluid through the membrane of the present invention.

In principle, by choosing the appropriate type of porous polymer substrate (high mechanical strength for reverse osmosis and high porosity for forward osmosis desalination applications), the polymer network entwined GO layer can be made into both reverse osmosis and forward osmosis membranes. In a particularly preferred embodiment the membrane of the present invention is used for reverse osmosis filtration.

In a particularly preferred application the membrane of the present invention is used for water desalination. In this application the present invention may provide very high water flux and excellent salt rejection.

Other aspects and preferred forms are disclosed in the specification and/or defined in the appended claims, forming a part of the description of the invention.

In essence, embodiments of the present invention stem from the realization that an improved ultrafiltration membrane can be created by adding a polymer network skin to two-dimensional nanosheet, such as a GO nanosheet.

Advantages provided by the present invention comprise the following:
high water flux;
excellent salt separation;
mechanical stability and processability;
chlorine tolerance;
high degree of NaCl rejection;
adaptable to a range of filtration applications;
facilitates energy efficient water desalination.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF THE DRAWINGS

Further disclosure, objects, advantages and aspects of preferred and other embodiments of the present application may be better understood by those skilled in the relevant art by reference to the following description of embodiments taken in conjunction with the accompanying drawings, which are given by way of illustration only, and thus are not limitative of the disclosure herein, and in which:

FIG. 5 is a thermogravimetric analysis plot of weight loss (wt %) against temperature (° C.) under inert conditions for GO (20), GO-polymer (1 ml) (21), GO-polymer (2 ml) (22) and monomers (23). The plots for GO-polymer membranes prepared by vacuum filtration at −0.1 MPa and −0.04 MPa are very similar;

DETAILED DESCRIPTION

The present invention provides filtration membranes, such as reverse osmosis filtration membranes. In particular, the membranes are graphene-based, combined with a polymer as a thin film layer on a porous substrate.

Figure 1:
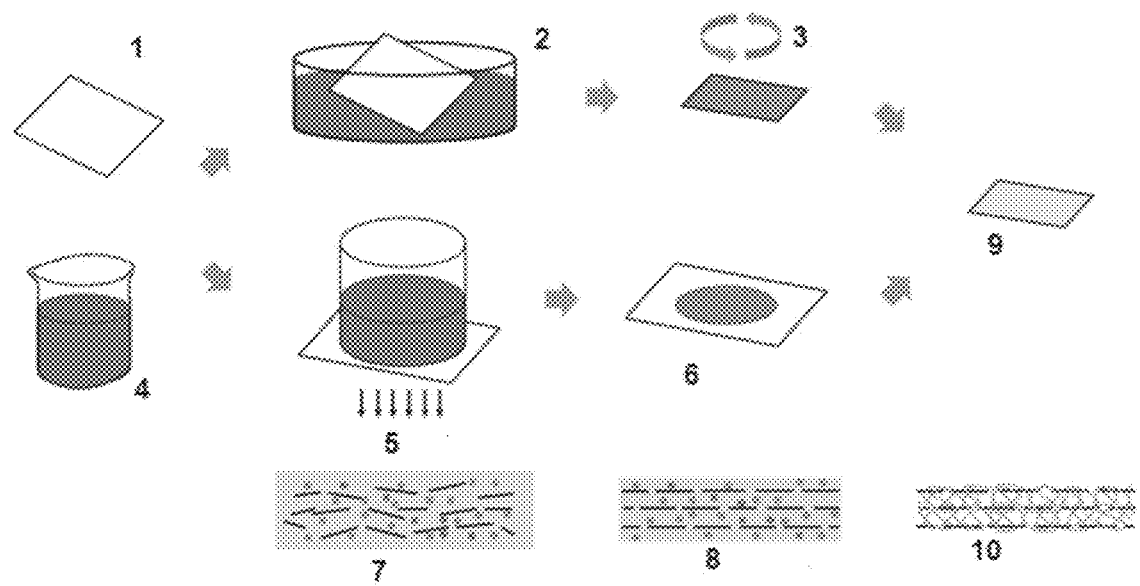
FIG. 1 illustrates a method of manufacturing the reverse osmosis desalination membranes of GO and polymer according to the present invention including obtaining porous substrate (1) dipping one side (2) and spin coating (3) or alternatively forming the precursor solution (4) applying it to the porous substrate by application of vacuum (5) to achieve filtration coating (5) then polymerising (9). During this process the solution of GO and monomers (7) becomes a coating of GO and monomers (8) and the polymerisation creates the GO polymer network (10)
Figure 2:
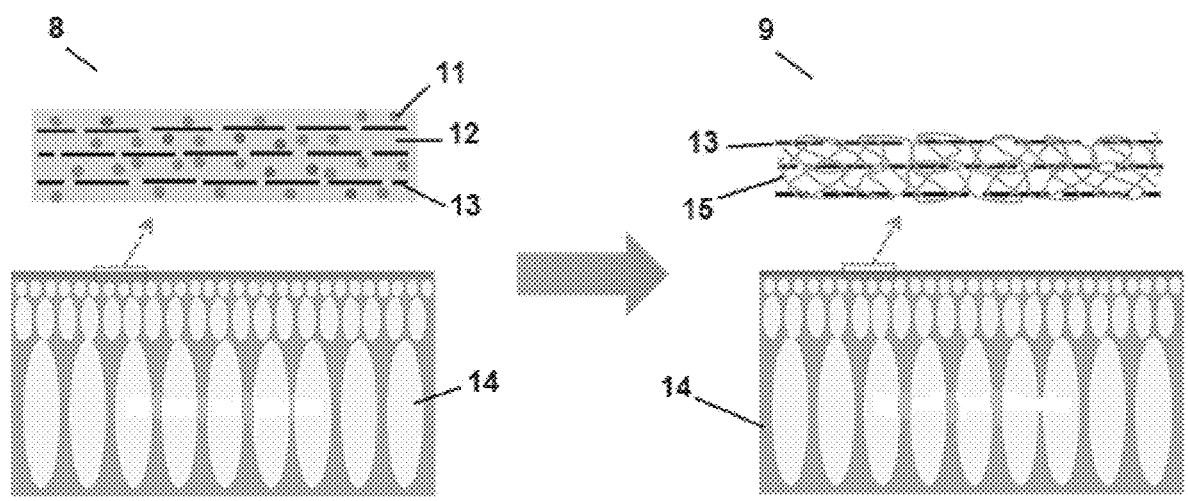
FIG. 2 is a schematic diagram of the polymerisation of the GO-polymer coating (8) on the porous substrate (14), the coating comprising monomers (11) filling up the GO scaffold (13) in the remnants of solution (12). Following polymerisation the GO scaffold (13) is entwined in a crosslinked polymer network (10)

Typically, the layer comprises GO nanosheets as a scaffold which is combined with a polymer and deposited as a film of tens of nanometers in thickness on a rough substrate surface as depict inn FIG. 1 and FIG. 2. The integration of GO and polymer provides the advantage of high water flux and rejection afforded by GO and good processability afforded by polymers, to provide a platform material suitable for use in a desalination membrane.

The fabrication of these desalination membranes consists of two main steps: (i) preparation of a porous substrate, and (ii) the application of a thin layer of a GO and polymer on the porous substrate.

Typically, the porous substrate can be any readily available commercially available or lab synthesised porous membrane that is appropriate for the type of filtration anticipated. For example, high pressure reverse osmosis filtration requires a porous substrate with low to medium size pores, such as ultrafiltration membranes, to ensure mechanical strength.

GO-polymer membranes according to the present invention are typically formed were formed on a porous substrate by spin-coating or filtration coating from a precursor solution, followed by free radical polymerization of monomers as shown in FIG. 1. A water-based precursor solution is formed from GO nanosheets, monomers and a polymerisation initiator such as ammonium persulfate. The monomers can be, for example, mono-functional or bifunctional terminal alkene groups with C=C double bonds such as N-isopropylacrylamide, 3-Buten-2-one, N,N-methylenebis(acrylamide), N,N-ethylenebis(acrylamide), or acrylaldehyde; 2-hydroxyethyl methacrylate and propylene glycol monoacrylate, and triethylene glycol dimethacrylate. Typically the mono-functional monomer forms the polymer backbone and bifunctional monomer acts as a crosslinker during polymerization.

Typically, the GO/polymer ratio in the precursor solution is between 0.1 and 70 wt %.

Typically, the total solid (monomers and GO nanosheets) concentration is between 0.5 to 5 wt % for spin-coating or between 0.01 to 50 wt % for filtration coating.

The precursor solution may be applied to the substrate by dipping and spin-coating or reduced pressure filtration coating as described in FIG. 1 and FIG. 2. For spin-coating, a substrate is typically floated on the precursor solution for a predetermined time, then spin-coated for 10 to 100 seconds at a speed in 500 to 5000 rpm. The spin-coating time and speed can be varied to control the layer thickness.

Subsequently, the substrate with the precursor solution coating is dried, such as in an oven at 50 to 100° C. to promote free-radical polymerization and to form the GO-polymer layer on a substrate. Spin-coating and polymerization can be repeated to ensure a defect-free GO-polymer layer on the substrate.

For filtration coating, a substrate may be located in a filtration set, or the precursor solution poured into a filtration set on a substrate, and a vacuum applied. Subsequently, the substrate with the precursor solution coating was located in an oven at 50 to 100° C. for free-radical polymerization to form a GO-polymer layer on a substrate. Thickness of a GO-polymer layer can be controlled by an amount of solution loaded in a filtration set.

The GO-polymer layer is typically characterised as having an asymmetric microstructure with a dense surface without substantial defects in which highly crosslinked polymers entwine graphene-oxide nanosheets.

EXAMPLES

The invention will be further described with reference to the following non-limiting example in which monofunctional N-isopropylacrylamide (NIPAM) and difunctional N,N'-methylenebis(acrylamide) (MBA) are used as monomers, and ammonium persulfate is used an initiator. Highly crosslinked poly(NIPAM-MBA) network is formed on a porous polymer substrate by free radical polymerization of NIPAM and MBA, which is initiated by thermal composition of ammonia persulphate. A defect-free, active layer with a very low thickness of less than 40 nm is successfully fabricated by spin-coating and in situ polymerization. The polymer network in the GO-polymer composite enables excellent membrane mechanical stability and processability while maintaining the physical properties of GO nanosheets that facilitate water transport. GO-polymer thin-film composite membrane endures high chlorine exposure at 1,000 ppm for 24 h without noticeable change, demonstrating outstanding chlorine tolerance.

Example 1: Fabrication of a GO-Poly(NIPAM-MBA) Membrane on a Commercial Ultrafiltration Membrane Support Fabrication of the GO-Polymer Membrane:

GO was synthesized from graphite powder by modified Hummers method. The concentration of the resulting GO suspension was 3.8 mg/ml in water. The GO concentration was determined by freeze-drying of 10 ml GO suspension, and weighing the residual solid (GO). Monomers to fabricate a polymer network within GO laminate scaffold including N-isopropylacrylamide (NIPAM), N,N'-methylenebisacrylamide (MBA), and ammonium persulfate were purchased from Sigma-Aldrich (St Louis, Mo.) and used without further purification. Specifically, 38 mg of NIPAM, 38 mg of MBA, and 7 mg of ammonia persulphate were dissolved into 10 ml GO suspension. To vary the ratio of GO/poly(NIPAM-MBA) from 4.5 to 50% (as per Table 1), the same amounts of NIPAM, MBA and ammonia persulphate were added into 10 ml GO suspension with a different GO loading, 3.4, 4.8, 9.5, 19, 28.5, and 38 mg. The GO suspension with a different GO loading was obtained by diluting 3.8 mg/ml GO suspension.

TABLE 1

Components used in the preparation:

| Samples | Monomers (mg) | | ammonia persulphate | Water (ml) | GO (mg) | GO conc. (mg/ml) | GO/polymer ratio (wt %) |
|---|---|---|---|---|---|---|---|
| | NIPAM | MBA | | | | | |
| GO-P61 | 38 | 38 | 7 | 10 | 3.4 | 0.34 | 4.5 |
| GO-P65 | | | | | 4.8 | 0.48 | 6.3 |
| GO-P72 | | | | | 9.5 | 0.95 | 12.5 |
| GO-P79 | | | | | 19 | 1.9 | 25.0 |
| GO-P87 | | | | | 28.5 | 2.85 | 37.5 |
| GO-P95 | | | | | 38 | 3.8 | 50.0 |

The precursor solution including GO and monomers was sonicated for 30 minutes to completely dissolve. Nylon membrane substrate, obtained from Sterlitech Corporation (product number NY4547100, Kent, Wash., USA), was used as a support layer with a diameter of 47 mm and average pore size of 450 nm. Nylon substrate was floated on 10 ml of precursor solution in a glass petri dish for 30 seconds, set on a spin-coater (WS-650-23B, Laurell Technologies Corporation, PA, USA), and spun for 30 seconds in 1,000 rpm, then located in a convection oven (Thermal Fisher) at 70° C. for 2 h for complete free-radical polymerization of monomers. Coating and polymerization procedures were repeated for 3 times to ensure the formation of a defect-free GO-polymer composite layer on the Nylon substrate.

Fabrication of the GO polymer layer on the ultrafiltration membrane substrate was achieved by floating the ultrafiltration membrane substrate on 10 ml of precursor solution in a glass petri dish for 30 seconds, set on a spin-coater (WS-650-23B, Laurell Technologies Corporation, PA, USA), and spun for 30 seconds at 1,000 rpm. It was subsequently heated in a convection oven (Thermal Fisher) at 70° C. for 2 hrs to achieve free-radical polymerization of monomers. The coating and polymerization procedures were repeated for 3 times to ensure the formation of a defect-free GO-polymer composite layer on the ultrafiltration membrane substrate.

Figure 4A:
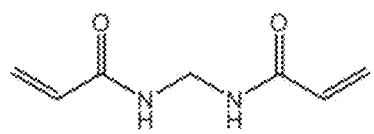
FIG. 4 illustrates the structures of preferred monomers and polymers for preparation of the polymer network, namely N, N'-methylene-bis-acrylamide (FIG. 4a), N-isopropylacrylamide (FIG. 4b) and poly(N-isopropylacrylamide-co-N,N'-methylene-bis-acrylamide) (FIG. 4c) and their reaction (FIG. 4d)
Figure 4B:
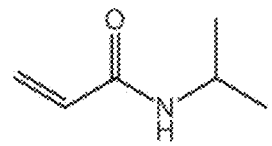
Figure 4C:
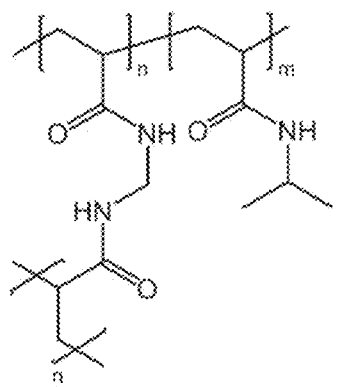
Figure 4D:
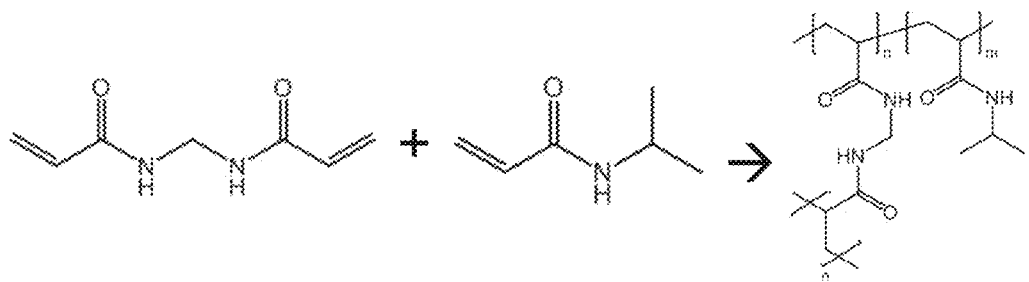

The generalised reaction of the N,N'-methylenebisacrylamide and N-isopropylacrylamide monomers to form the cross lined polymer network of poly(N-isopropylacrylamide-co-N,N'-methylenebisacrylamide) can be depicted as shown at FIG. 4d:

Characterization.

Figure 3A:
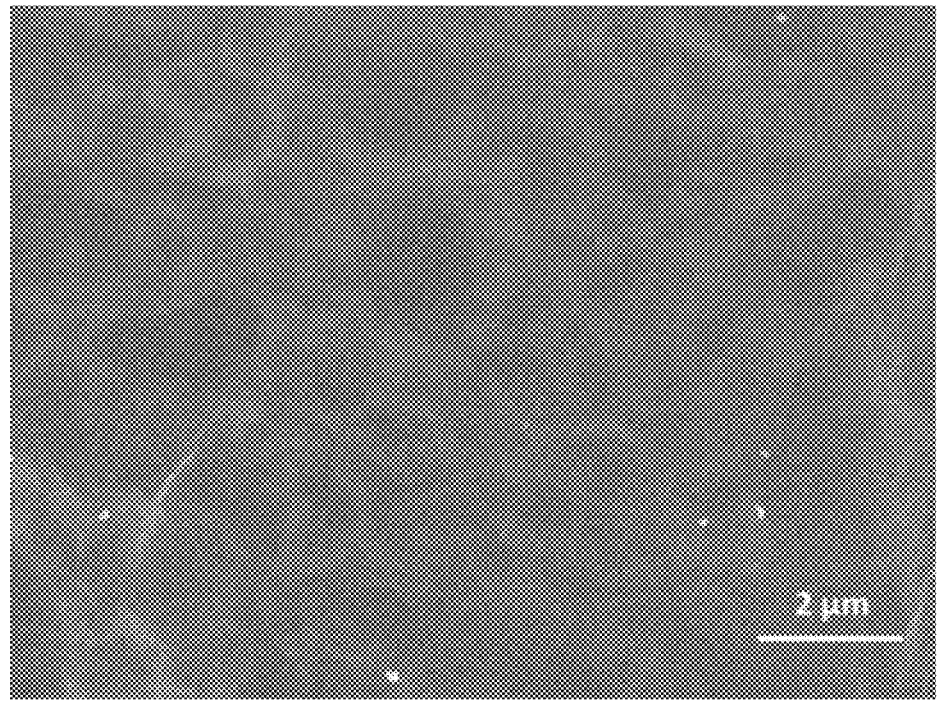
FIG. 3 illustrates scanning electron microscope (SEM) images of the surface (FIG. 3a) and a cross section (FIG. 3b) of a membrane according to the present invention fabricated onto the commercial ultrafiltration membrane substrate. The membrane layer thickness can be seen from the cross-sectional SEM image to be about 30 nm.
Figure 3B:
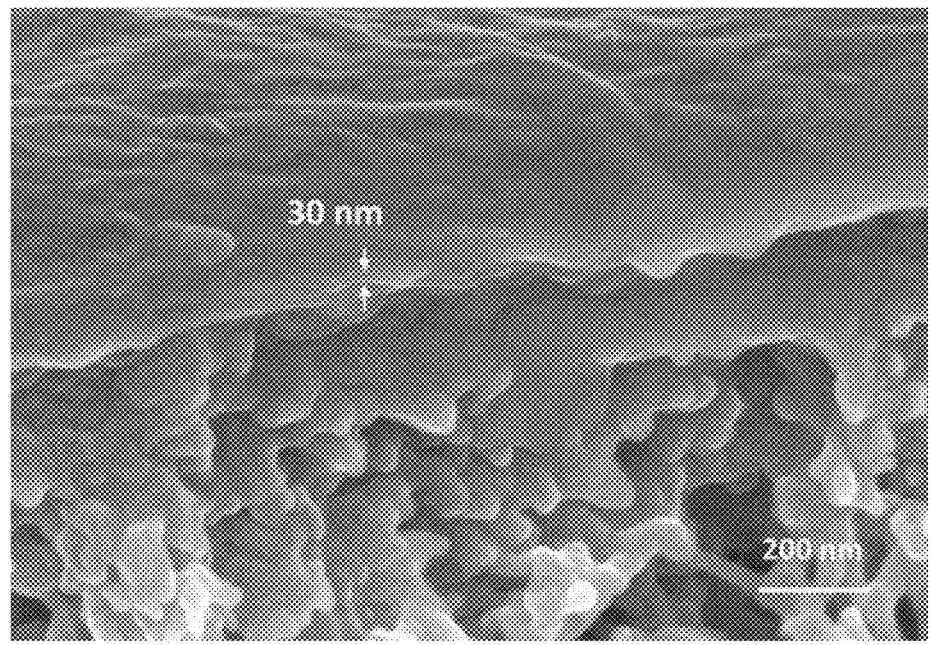

The morphology of GO-polymer membranes was observed using a field emission scanning electron microscope (FE-SEM) (Nova NanoSEM 450, FEI, Hillsboro, Oreg.). A uniform membrane according to the present invention and without visible defects was fabricated onto the commercial ultrafiltration membrane substrate with rough surface as confirmed by SEM images (FIG. 3). The membrane layer thickness can be seen from the cross-sectional SEM image to be about 30 nm. Without wishing to be bound by theory it is believed that GO nanosheets serve as a scaffold and play a key role in forming such a thin film on the rough substrate surface. During the polymerization process, the monomer solution confined within the GO laminate layer, where the polymerization occurred, leading to defect-free nanocomposite membranes from a highly crosslinked poly(NIPAM-MBA) network that physically entwined GO nanosheets.

The resulting reverse osmosis membrane performance is shown in Table 2.

TABLE 2

Water flux and salt rejection properties of GO-polymer membranes as a comparison of commercial membranes.

| Membrane | Water Flux (Lm$^{-2}$h$^{-1}$) | Salt Rejection (%) |
|---|---|---|
| GO-polymer | 43-50 (at 150 psi) | 99.2 |
| Commercial CA** (Cellulose triacetate/diacetate Blend from GE) | 17-30 (at 425 psi) | 98.5 |
| Commercial PA** (DURASLICK ™ from GE) | 15-25 (at 200 psi) | 98.6 |

*Feed solution: 2,000 mg/L NaCl solution
**G. Infrastructure, Desal(R) PURE WATER Membrane Technology & Applications, in: W.P.T. GE Infrastructure (Ed.) GE Infrastructure, Trevose, PA, 2004.

Results and Discussion

Polymer network entwined GO membranes were fabricated to demonstrate their high performance in reverse osmosis water desalination process. An ultrafiltration membrane was chosen as a substrate. The random copolymer, poly(N-isopropylacrylamide-co-N,N'-methylene-bis-acrylamide) (or poly(NIPAM-MBA)), was produced by free radical polymerization of NIPAM and MBA monomers via opening of C=C double bond. Poly(NIPAM-MBA) is densely crosslinked and hydrophilic, and firmly becomes entwined around GO laminate scaffold on the ultrafiltration substrate, allowing water permeation and rejecting hydrated ions. Importantly this poly (NIPAM-MBA) polymer network is highly stable in chlorinated water and mechanically robust for membrane fabrication and operation.

The GO-poly(NIPAM-MBA) thin selective layer was prepared by spin coating and subsequent polymerization and drying. The mass ratio of GO and monomers in the precursor solution was varied from 4.5 to 50.0 wt % GO to investigate the effects of membrane composition on the water flux and rejection of the membrane. During the spin-coating, different proportions of the monomer solution and GO nanosheets were lost under centrifugal force due to molecular size and structure. Micro-sized GO nanosheets assembled into a laminate scaffold on the Nylon substrate, where a significant amount of monomers was lost with water during the spin coating and the remained monomer solution was confined within GO interlayer spaces. Consequently, the ratio of GO/poly(NIPAM-MBA) changed after the spin-coating. Without GO nanosheets, all of the monomer solution was lost whilst being spin-coated, and no coating was formed. To determine the actual GO content in the GO-polymer layer, thermogravimetric analysis was conducted and the GO weight percentage was calculated on the basis of relative weight loss of polymer and GO. The actual GO amount ranged from 60.7 to 95.1 wt %.

Example 2: Fabrication of GO Laminate-Poly(NIPAM-MBA)

The following illustrates how the process of free-radical polymerisation in aqueous conditions of a GO suspension enables the formation of a GO-polymer network without covalent bonding between GO and polymer, leading to a combination of mechanical robustness, remarkable water transport properties, and an anti-swelling tendency suitable for the high-pressure operation required for reverse osmosis (RO) membrane process.

The GO-polymer membrane prepared according to the present invention was not swollen during RO operation and remained stable under a harsh oxidising environment. It also demonstrated water flux of 33.5 L m$^{-2}$ h$^{-1}$ with 98.5% NaCl rejection at 10 bar when prepared by high-vacuum filtration and subsequent polymerisation of the precursor solution on to a mesoporous substrate. This methodology indicates that large-scalable membrane fabrication is feasible.

Fabrication of the GO Laminate-Polymer Membrane:

Free radical polymerisation has been applied for formation of polymer network such as copolymers, micelles, or hydrogels, due to its rapid reaction under mild conditions. In this experiment, a hydrophilic and highly cross-linked polymer network was synthesised with GO laminates on a porous polymer substrate by vacuum assisted filtration and subsequent polymerisation.

Materials:

GO was synthesised using a modified Hummer's method, [Dikin et al, Nature 2007, 448, 457; Hummers & Offeman, J. Am. Chem. soc 1958, 80, 1339) from graphite powders obtained from Sigma-Aldrich (St Louis, Mo.). For preparation of polymer network, N-isopropylacrylamide (NIPAM), N,N'-methylenebisacrylamide (MBA), and ammonium persulfate (APS) were purchased from Sigma-Aldrich and used without further purification. Sodium chloride (NaCl) and sodium hypochlorite for membrane characterisation were purchased from Merck (Kenilworth, N.J.) and Sigma-Aldrich, respectively. Porous poly(ether sulfones) (PES) membranes were used as a substrate. Commercial polyamide (PA) membranes (DOW FILMTEC™ BW30) were obtained from Stelitech (Kent, Wash.).

Fabrication of the GO-polymer membrane: 45 mg of NIPAM, 45 mg of MBA and 25 mg of APS were dissolved in 10 ml of GO solution (1.0 mg/ml). The precursor solution was filtered through the PES substrate using a glass filtration set with a circulating water vacuum pump (maximum vacuum capacity: 0.098 MPa) at vacuum levels of −0.04 MPa or −0.1 MPa (−0.098 MPa), then the substrate was placed in a convection oven (Thermal fisher, Scoresby, Australia) at 60° C. for 1 h for complete polymerisation. The resulting membrane was used for characterisation without further treatment.

Characterisation:

The weight ratio between GO and polymer in the GO-polymer composite was determined by thermogravimetric analysis (TGA, PerkinElmer, MA). The precursor solution containing GO and monomers without initiator (APS) was prepared and filtered on the PES substrate by vacuum at −0.04 and −0.1 MPa with the volume of 1.0 and 2.0 ml, then carefully peeled off the substrate and dried for TGA. The morphology of the GO-polymer membranes was investigated with a field emission scanning electron microscope (FE-SEM, Nova NanoSEM 450, FEI, Hillsboro, Oreg.). The crystalline structure of the membrane samples was determined by using an X-ray diffraction technique (XRD, Miniflex 600 X-ray diffractometer, Rigaku, Japan). The chlorine tolerance of the GO-polymer membranes and the PA commercial membranes were characterised using aqueous sodium hypochlorite (NaClO) solution at concentration of 100, 500, and 1,000 ppm. A coupon of membrane was immersed in the NaClO solution and kept for 24 h at room temperature, then the membrane was taken out and completely washed for following water flux and NaCl rejection measurements.

Water Flux and Salt Rejection:

The water flux and salt rejection properties of the GO-polymer membranes and the PA commercial membranes were measured from deionised (DI) water and 2,000 ppm NaCl aqueous solution using a high-pressure stirred cell (HP4750, Sterlitech, Kent, Wash.). The membrane with an effective area of 14.6 cm$^2$ was loaded into the RO testing cell and feed solution was pressured at between 5 to 35 bar. To study the effect of NaCl concentration, water flux and salt rejection of the GO-polymer membranes were measured with the NaCl solutions ranged from 2,000 to 15,000 ppm at 20 bar. The water flux of the membrane was calculated from the weight changes and the electrical conductivity of the feed and permeate solutions was measured to determine the salt concentration which was used to calculated the salt rejection.

Discussion:

Vacuum filtration is a widely adopted method for preparing uniform GO laminates, but a large volume of GO solution is often employed, which significantly extends filtration time. Unlike vacuum filtration methods of the prior art, the present invention uses filtration of a small volume of the precursor solution containing GO and monomers and its subsequent polymerisation formed a defect-free GO-polymer membrane with a much shorter filtration time, which is highly feasible for scaling up membrane fabrication for practical application. Moreover, use of the vacuum assisted method to form the polymer composite membrane improves adhesion between the membrane layer and a substrate since the polymer formed penetrates into the nanopores of the skin layer of the substrate under the influence of the vacuum.

The monomers used to produce the polymer network contain a large component of bifunctional monomers and a small part of monofunctional monomers to maximise mechanical strength by balancing flexibleness and modulus, with an aim that the highly cross-linked and dense polymer network-entwined GO layer is mechanically strong and chemically durable. As schematically illustrated in FIG. 2, the cross-linked polymer network tightly entwines the graphene oxide laminates to form a GO-polymer layer, where polymer and GO laminates are physically interconnected.

The degree of vacuum for filtration influences the membrane morphology as it controls the filtration rates of monomers and GO laminates, ultimately determining the interlayer spacing of GO-polymer membranes. After the GO laminates form a dense GO layer on the substrate at the initial stage of filtration, monomer accumulates between GO laminates, forming the asymmetric structure of the GO-polymer layer, with a proportion of denser GO at the bottom of the membrane adjacent the substrate, and a proportion of less dense and looser GO at the top of the GO-polymer layer. This GO-polymer composite membrane also retains the intrinsically desirable properties of pristine GO laminates, that is, fast and selective water transport since there is no chemical reaction between GO and the polymer. It also demonstrates a significant anti-swelling property due to the highly cross-linked structure. The rapid reaction of radical polymerisation also allows for a very rapid and well-defined membrane fabrication.

As an initial step, the water-based precursor solution containing GO laminates and monomers (N-isopropylacrylamide (NIPAM), N,N'-methylenebis(acrylamide) (MBA) and ammonium persulfate (APS)) were filtered under vacuum on poly(ether sulfone) (PES) substrates with nanometre-sized pores. The membrane was then placed in a convection oven to initiate free-radical polymerisation and prepare GO-poly(NIPAM-MBA).

Figure 5:
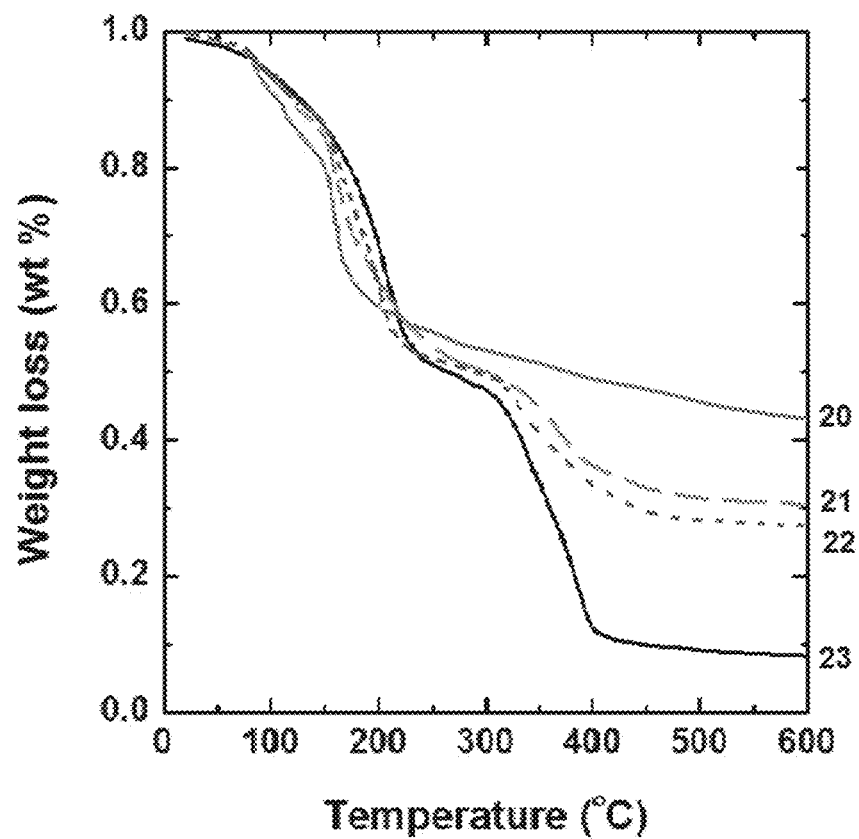
Figure 6A:
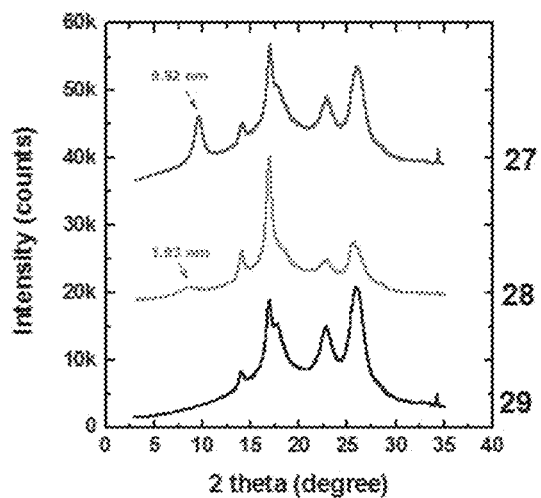
FIGS. 6a and 6c illustrate loadings of 2.0 ml (27), 1.0 ml (28) and the PES substrate (29). The dried GO-polymer membranes prepared with different amounts of GO-monomer solution (25) and wet (26) GO-polymer membrane prepared with 2.0 ml loading of GO-monomer solution.
Figure 6B:
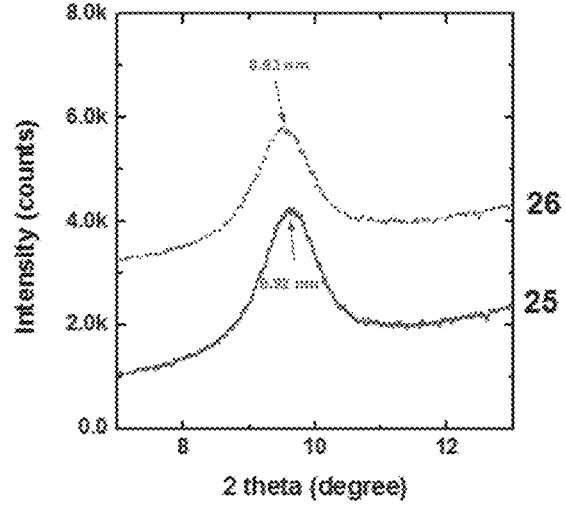
FIG. 6 illustrates X-ray diffraction (XRD) patterns of the GO-polymer membranes prepared by vacuum filtration at −0.04 MPa (GOP-L) (FIGS. 6a & 6b) and −0.1 MPa (GOP-H) (FIGS. 6c & 6d).
Figure 6C:
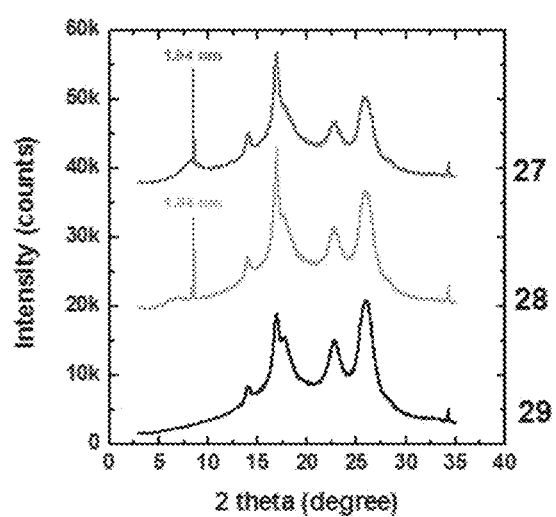
Figure 6D:
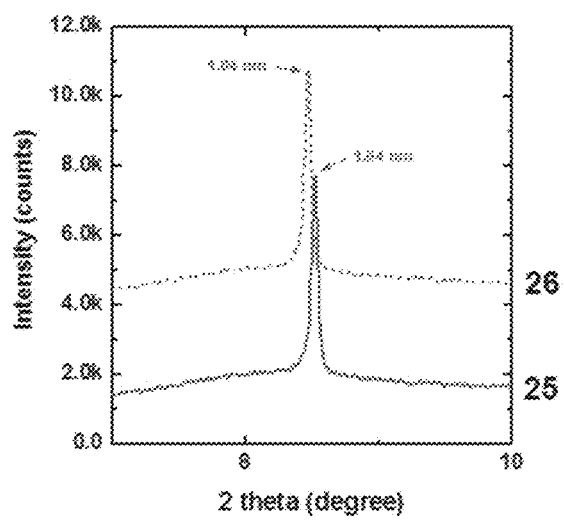

During solution filtration, water soluble monomers were able to pass through the substrate, whereas water-dispersed GO laminates were remained on the surface of the substrate. After forming the dense GO layer on the surface, monomers were trapped between GO and formed cross-linked polymer network with GO laminates. Due to the loss of monomers during filtration, the ratio between GO and polymer changed from the initial ratio in the precursor solution. The precursor solution between 0.5 and 3.0 ml was filtered at the low (−0.04 MPa) and high (−0.1 MPa) vacuum levels on the substrate with effective area of 17.3 cm². The weight ratio between GO and monomers in the precursor solution was 1:10, but after filtration and polymerisation, the GO percentages changed to a range of 50 to 70 wt % depending on fabrication conditions, as can be determined from thermogravimetric analysis (TGA) under the inert condition and described in FIG. 5.

Thermal stability of GO laminates and monomers containing NIPAM and MBA were measured as a reference. Thermal decomposition of hydroxyl groups on GO was evidenced with the weight loss around 200° C. and 43% of residual graphene was remained after measurement up to 600° C.

For monomers, the first weight loss between 100 and 250° C. was attributed to the loss of aliphatic alkene groups in MBA and of most NIPAM with a low boiling point. 8% of the carbonized compound was remained at 600° C. Comparing with the residual weight at 600° C., the weight ratio between GO and polymer was confirmed and summarised in Table 3. When high vacuum pressure was applied during filtration, the percentage of GO was higher as compared to low vacuum pressure, but the difference was not significant. In the cases of the high and low levels of applied vacuum, the percentage of GO was lower when more solution was loaded because more monomers were accumulated between GO laminates.

TABLE 3

GO contents in GO-polymers after filtration:

| Samples | Applied vacuum pressure [MPa] | Solution loading [ml] | GO/poly(NIPAM-MBA) weight ratio [%] | |
|---|---|---|---|---|
| | | | In solution (GO/monomers) | In membrane (GO/polymer) |
| GOP-L1.0 | −0.04 | 1.0 | 10 | 63 |
| GOP-L2.0 | | 2.0 | | 54 |
| GOP-H1.0 | −0.01 | 1.0 | 10 | 65 |
| GOP-H2.0 | | 2.0 | | 58 |

The morphology of the effective layer of the GO-polymer membrane was also influenced by vacuum levels applied for filtration and volume of solution loaded. Scanning electron microscopy showed that thin, aligned and uniform GO-polymer layers resulted when the high-level vacuum of −0.1 MPa was applied.

The GO-polymer membrane formed has a layer thickness of few-hundreds nanometres, depending on preparation conditions, such as a volume of solution loading or filtration vacuum levels. The thickness of the effective layer gradually increased as a function of volume of solution loading ranging from 0.1 to 1.3 μm from precursor solution loading between 0.5 to 3.0 ml. The effective layer was somewhat irregular due to the rough surface of the substrate. When a solution less than 1.0 ml was loaded, the layer thickness was around 150 nm, meaning that GO and monomers were instantly filtered under −0.1 MPa and formed a thin layer. However, the layer from loading of 3.0 ml was much thicker than expected (1.1-1.3 μm), indicating that early on in the process, the GO laminates blocked pores of a substrate and prevented the application of a greater vacuum, leading to a compact GO-polymer layer at the later stage of filtration.

When the low level vacuum was used, the solution loading volume dependency was not significant. Compared to membranes prepared at −0.04 MPa and different solution loading of 0.5 and 2.0 ml, the thickness of layers only increased from 500 to 600 nm, meaning that the volume of solution loading effects compactness of the effective layer, but not on the layer thickness itself. Moreover, when comparing with the membranes prepared by 1.0 ml solution loading at high and low vacuums, the membrane prepared at low vacuums were some three times thicker, although their GO percentages were similar to each other.

High-resolution SEM images are often used to confirm graphene or GO laminates aligned in graphene-based membranes. Graphene laminates in the polymer-graphene composite were also observed in SEM images when polydiacetylene and graphene were stacked within a composite film. The parallel, aligned GO laminates in the polymer network were clearly observed close to the substrate which led to the mechanically robust membrane effective layer and the formation of a defect-free membrane. However, GO laminates in SEM images are not as clear as GO in pure GO membranes because the polymer network is entwined and covers GO laminates. In the case of GOP-L1.0, the aligned GO layer was not clearly recognised, meaning that GO laminates were rather randomly stacked on a substrate and formed a less dense and thick GO-polymer network which retained the ability to become further compacted should more solution be introduced.

FIG. 6 shows X-ray diffraction (XRD) spectra of the GO-polymer membranes and the PES substrate. The PES substrates have a typical amorphous structure with scattered XRD bands. After forming the GO-polymer layer on the substrate, a broad or sharp band around 8° was observed, indicating an interlayer spacing of GO in the polymer composites of around 0.9 to 1.0 nm.

It was found that preparation conditions affected the interlayer spacing of the membranes. When the low vacuum of −0.04 MPa was applied for the membrane preparation, the XRD band was broad. The intensity was relatively weak when 1.0 ml solution was loaded due to the thin layer on the substrate, but after loading 2.0 ml, the band became more resolved as the full width at half maximum (FWHM) of 2.58 and 1.47 degree were recorded for the GO peak after loading 1.0 and 2.0 ml. However, when a higher vacuum of −0.1 MPa was applied, a sharp and strong peak at 8.5° was observed from the more tightly packed GO-polymer structures.

Clearly the high vacuum helps to firmly align GO laminates during filtration and the resulting GO-polymer network is highly ordered and compact. The FWHM is estimated to be 0.115 and 0.068 degree when 1.0 and 2.0 ml solutions were loaded. It is known that the separation capability of GO membranes is significantly limited in an aqueous phase due to the high swelling as the interlayer spacing between GO laminates are enlarged and salt permeability is increased, which can be a major drawback in using GO membranes for water processing. However, the swelling can be confined by the combination of GO with a cross-linked polymer network since the amount of water entrapped inside the interlayer space between GO nanosheets is limited to crosslinking of GO.

The X-ray diffraction patterns of the GO-polymer composite membranes were observed in dry (FIGS. 6a & 6d) and wet (FIGS. 6b & 6c) phases to analyse the interlayer spacing and investigate their swelling behaviours. After hydration, the broad peak shift of the GO-polymer composite was almost negligible, demonstrating that the cross-linked polymer tightly fixed GO laminates within its network, preventing swelling when hydrated.

Figure 7A:
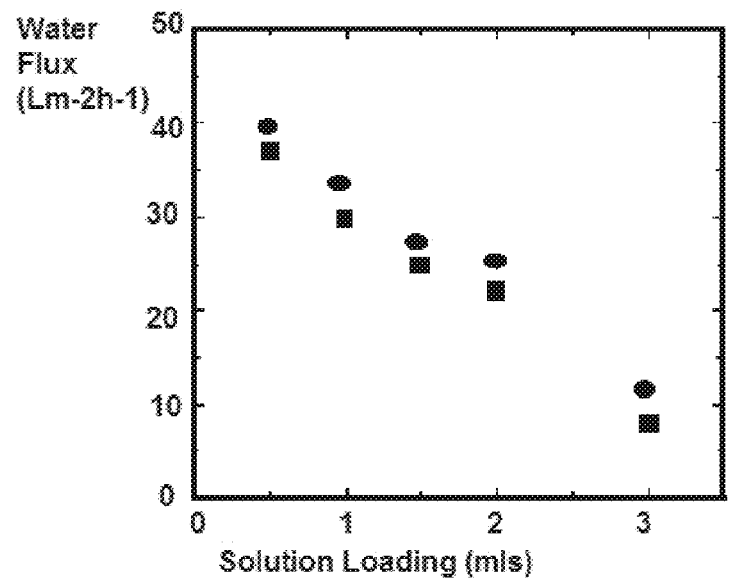
FIG. 7 illustrates pure water flux (FIG. 7a) at low vacuum (■) and high vacuum (●) and water flux and salt rejection (FIG. 7b) of GO-polymer membranes (GOP-L ■ and GOP-H ●) measured using 2,000 ppm NaCl solution as a function of solution loading.
Figure 7B:
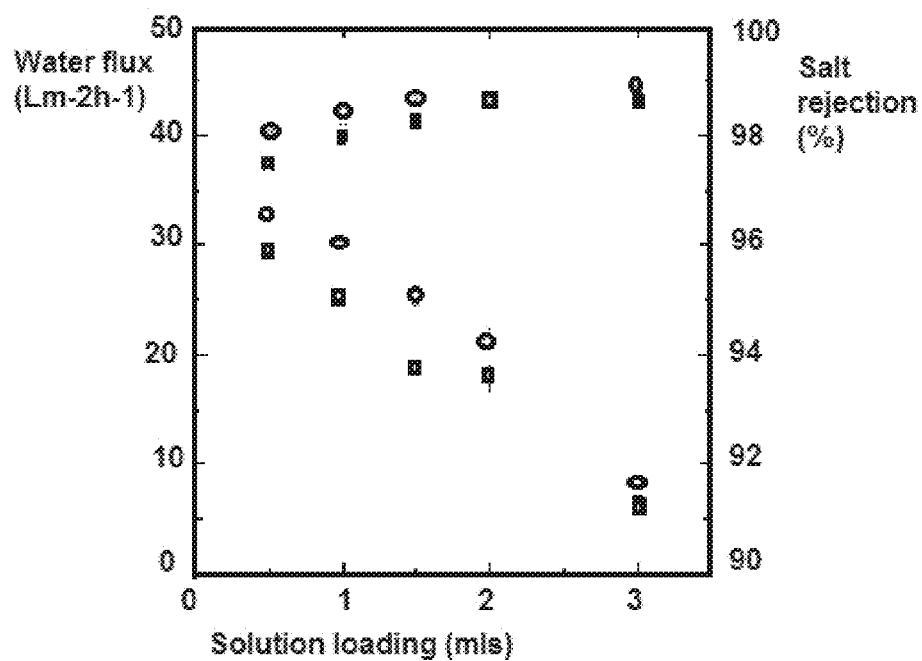

The hydrophilic and ultrathin GO-polymer membranes were capable of achieving fast and selective water transport with high salt rejection. Water flux and salt rejection properties of GO-polymer membranes prepared under low and high vacuum have been investigated at RO processes from deionised (DI) water and 2,000 ppm sodium chloride (NaCl) solution using a dead-end filtration set-up at 10 bar. As illustrated in FIG. 7, both DI water and salt water flux were linearly decreased as a function of a volume of solution loading at preparation and salt rejection was slightly increased.

Water transport is an intrinsic property of membrane materials, but water flux can be determined by membrane thickness as well as compactness of effective layers. In case of the membrane prepared at −0.1 MPa, water flux was gradually decreased from 39.3 to 11.3 L m$^{-2}$ h$^{-1}$ when solution loading was increased from 0.5 to 3.0 ml, which also corresponds to the increase in effective layer thickness observed in SEM images.

When 2,000 ppm NaCl solution was used as a feed, salt water flux was slightly lower than pure water flux ranged between 32.9 and 8.3 L m$^{-2}$ h$^{-1}$ resulting from the lower driving force due to osmotic pressure of salt solution. The membranes exhibited high salt rejection properties which increased from 98.1 to 98.9% as membrane layer became thicker. Note that thin effective layer could benefit high water flux, but it can also lead to defects on membranes and reduced salt rejection. Moreover, GO laminates in the effective layer of the membrane easily form nanochannels during the membrane preparation for precise water transport, which greatly improve separation property of the GO-polymer membrane. However, when the more than 1.0 ml solution was loaded, the membranes demonstrated both high water flux over 30 L m-2 h-1 and high salt rejection over 98.5%. In case of the membrane prepared at −0.04 MPa, water flux was ranged from 37.1 to 8.3 L m$^{-2}$ h$^{-1}$ depending on solution loading which was a bit lower than the membrane prepared under high level vacuum. In addition, a similar trend due to the volume of solution loaded on salt water flux and salt rejection properties was observed, as salt water flux was ranged between 29.7 and 6.1 L with salt rejection ranging between 97.5 and 98.7%.

Thickness of the effective layers is one of the major property that determines a molecular transport property of composite membranes. However, the density, or compactness of the effective layer also influences a water flux of RO membranes because the less-compact layer allows molecules to permeate through the layer resulting in high flux and low rejection properties. Although the effective layer thickness of the GO-polymer membranes was around 200 nm regardless of solution loading for membranes prepared at −0.04 MPa, the water flux and the salt rejection were very different. In this case, salt rejection improved when more solution was loaded during preparation, which means the membrane effective layer became more compact.

Table 4 summarises water flux and NaCl rejection properties of PA-based thin film composite (TFC) membranes with high water flux as a comparison of the GO-polymer membranes. Commercial RO membranes in general exhibit over 98% NaCl rejection, but there is a trade-off relationship between water flux and salt rejection as RO membranes with higher rejection demonstrate relatively lower water flux.

Many approaches have been conducted to enhance RO performances by incorporating nanomaterials into PA. GO incorporated PA membranes with a small amount of GO loading showed 50% increase in water flux from the pristine PA membrane with relatively low NaCl rejection of 93.8%, but a large amount of GO loading significantly reduced water flux while increasing NaCl rejection to 99.5%. [14e] Introduction of nanomaterials, such as carbon nanotubes (CNTs) and zeolitic imidazolate frameworks (ZIFs) nanoparticles effectively improved water flux and/or NaCl rejection by providing microporous structure from nanoparticles in PA matrix. Although their high water flux and salt rejection can improve productivity and efficiency of RO processes, the drawbacks of poor chemical stability still remain in these PA-based membranes because of degradation of amide bonds in oxidising agents. The GO-polymer membrane in this study exhibited high water flux and salt rejection property as compared to PA-based RO membranes; this study provided a good strategy for developing RO membrane to overcome the stability issue of commercial membranes since the GO-polymer exhibits excellent chemical stability to resist oxidising agents.

TABLE 4

Comparison of RO performances of this work with the literature data related to high flux RO membranes.

| Membrane materials | Trans-membrane pressure [bar] | NaCl concentration [ppm] | Water permeance [L m$^{-2}$ h$^{-1}$/ bar] | NaCl rejection [%] | Ref. |
|---|---|---|---|---|---|
| GOP_H1.0 | 10 | 2,000 | 3.01 | 98.5 | This invention |
| PA | 20 | 2,000 | 2.77 | 98.1 | g |
| PA-GO | 20.7 | 2,000 | 2.87 | 93.8 | a |
| PA on CNT/PSf | 15.5 | 2,000 | 3.03 | 97.7 | b |
| PA-ZIF8 | 15.5 | 2,000 | 3.35 | 98.5 | c |
| PA-zeolite | 15.5 | 2,000 | 4.79 | 98.8 | d |
| PA-GO | 15.5 | 2,000 | 1.07 | 99.5 | e |
| PA-POSS | 55 | 32,000 | 0.892 | 99.6 | f |

Refs: a) J. Yin, G. Zhu, B. Deng, *Desalination* 2016, 379, 93; b) T. H. Lee, M. Y. Lee, H. D. Lee, J. S. Roh, H. W. Kim, H. B. Park, *J. Membr. Sci.* 2017, 539, 441; c) J. Duan, Y. Pan, F. Pacheco, E. Litwiller, Z. Lai, I. Pinnau, *J. Membr. Sci.* 2015, 476, 303; d) H. Dong, L. Zhao, L. Zhang, H. Chen, C. Gao, W. W. Ho, *J. Membr. Sci.* 2015, 476, 373; e) H.-R. Chae, J. Lee, C.-H. Lee, I.-C. Kim, P.-K. Park, *J. Membr. Sci.* 2015, 483, 128; f) J. H. Moon, A. R. Katha, S. Pandian, S. M. Kolake, S. Han, *J. Membr. Sci.* 2014, 461, 89; g) H. Wang, L. Li, X. Zhang, S. Zhang, *J. Membr. Sci.* 2010, 353, 78.

Pressure dependence on water flux and salt rejection can be an important parameter since industrial RO processes are operated at high pressure to overcome the osmotic pressure of seawater and to generate pure water.

Pure water flux of the commercial PA membrane and the GO-polymer membrane prepared under −0.1 MPa vacuum and 1.0 ml solution loading, which demonstrated high water flux and salt rejection, were measured in the pressure ranged between 5 and 35 bar using a dead-end filtration set-up. For the PA commercial membrane, the water flux showed a concave increase to the pressure axis meaning that the PA layer of the membrane suffered from the compaction effect illustrated in FIG. 8.

At high pressures, the PA layer became compressed and dense, as a result water permeability decreased. This compaction effect can be disadvantageous to the RO process with the loss of productivity on the operational conditions. However, in the case of the GO-polymer membranes, water flux almost linearly increased as input pressure increased. The mechanically-robust effective layer of the GO and polymer network improved anti-compaction properties and the membrane structure was retained, even at high pressures.

Figure 9:
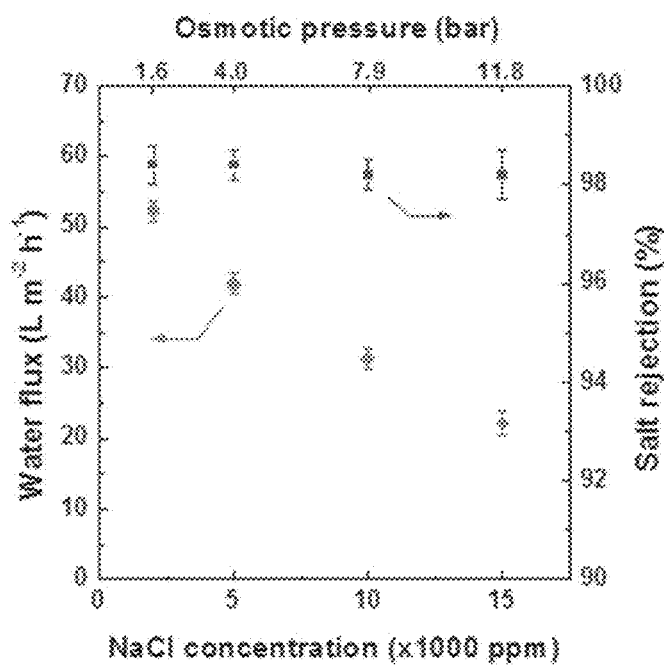
FIG. 9 illustrates a plot of water flux (●) and salt rejection (■) of GOP-H1.0 as a function of feed solution concentration.

Considering practical RO operation, seawater contains around 35,000 ppm NaCl, having an osmotic pressure of 27.6 bar. Therefore, high feed pressure is required to overcome the high osmotic pressure in the RO process. The effects of feed solution concentration were investigated by measuring the water flux and salt rejection of the GO-polymer membranes at 20 bar at the feed NaCl concentration ranging from 2,000 to 15,000 ppm (osmotic pressure ranged from 1.6 to 11.8 bar) as shown in FIG. 9.

Figure 8:
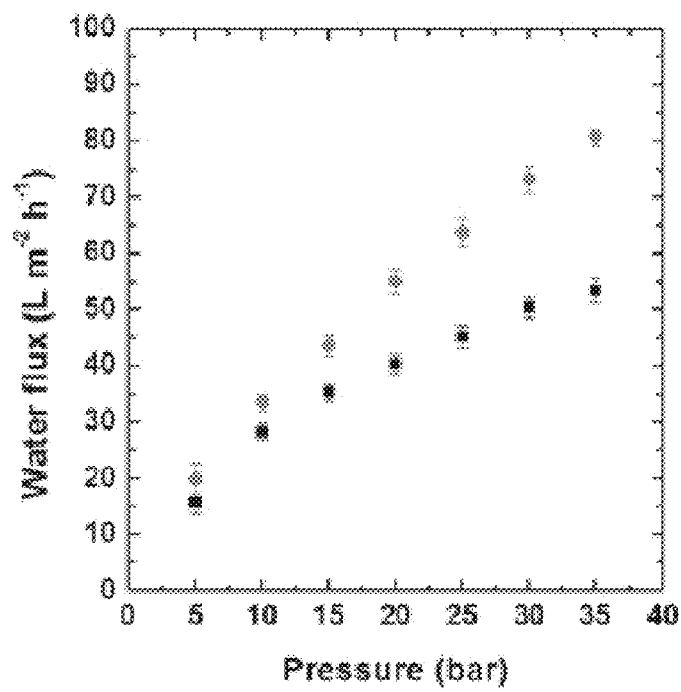
FIG. 8 illustrates a plot of water flux of GOP-H1.0 (●) and the commercial PA (■) membrane as a function of applied pressure.

To accurately measure the water flux by minimising the effect of the concentration polarisation, where the salt concentration on the membrane surface at the high pressure side becomes excessive and water flux is decreased due to greater osmotic pressure on the feed side. Therefore, the maximum concentration of the feed was limited to 15,000 ppm to ensure accurate measurement of salt rejection, although the GO-polymer membrane was mechanically stable under the test with 35,000 ppm NaCl solution (FIG. 8). The GOP-H1.0 membrane showed 52.3 L m-2 h-1 when 2,000 ppm NaCl solution was used. But the water flux gradually decreased when NaCl concentration increased. This was because the difference between the operating pressure and the osmotic pressure of the feed decreased. However, the GOP-H1.0 membrane demonstrated a stable NaCl rejection of around 98.3%.

When considering practical RO applications, chemical durability in oxidising environments, especially chlorine tolerance, is an important property. In a current PA-based RO system, chlorine in the feed water is commonly introduced to minimise membrane biofouling, however, dechlorination and rechlorination steps are required before and after feed water passing though the RO membrane to protect the PA membranes which suffer from poor chlorine stability, which leads to additional processes and costs.

Figure 10:
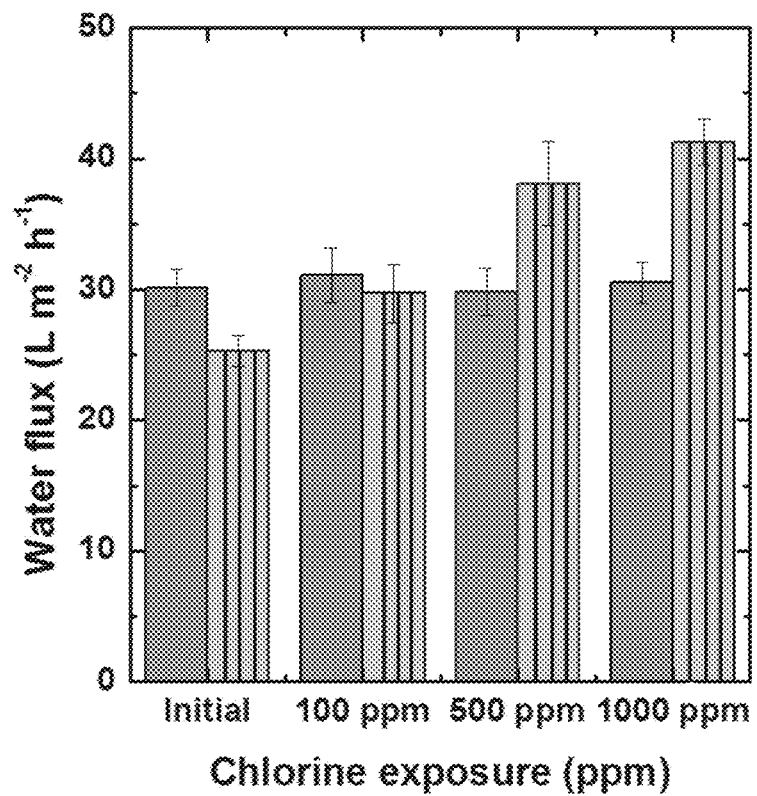
FIG. 10 is a plot illustrating the effect of chlorine exposure on water flux of GO-polymer membranes compared with commercial PA membranes (stripes)
Figure 11:
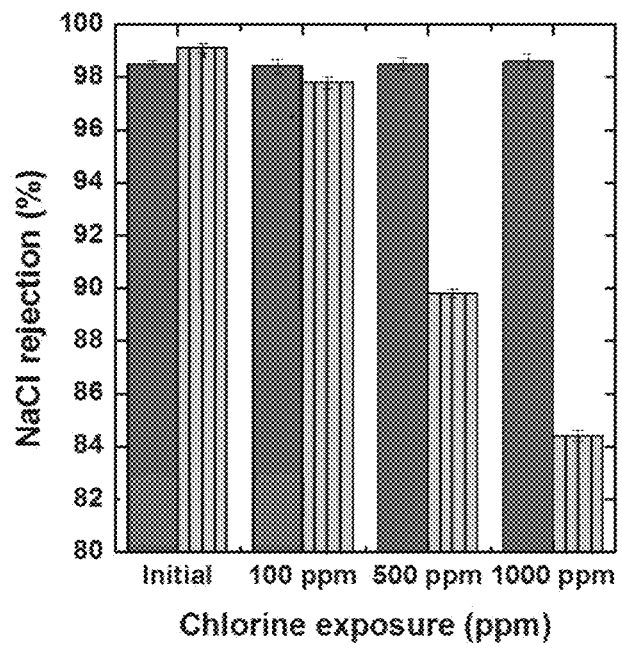
FIG. 11 is a plot illustrating the effect of chlorine on NaCl rejection properties of GO-polymer membranes and commercial PA membranes (stripes)

Since commercial RO membranes are continuously operated for 3-5 years and require cleaning once the module is installed, the chlorine stability in the repeated exposure cycles is essential. To characterise chlorine stability of GO-polymer membranes, sodium hypochlorite (NaClO) solution was introduced in 100, 500, and 1,000 ppm concentrations. The GO-polymer membranes and the commercial PA membranes were immersed in NaClO solution for 24 h, then water flux and NaCl rejection measured at 10 bar. As shown in FIGS. 10 and 11, the active layer of the PA membrane was damaged and resulted in increase in water flux and dramatic decrease in NaCl rejection because amide bonds in PA are readily cleaved in the chlorine-rich conditions. However, the GO-polymer membrane showed a remarkable chlorine tolerance due to its amide-bond-free structure, as well as the strong sp2 structure of GO, meaning that changes in water flux and NaCl rejection were negligible.

Figure 12:
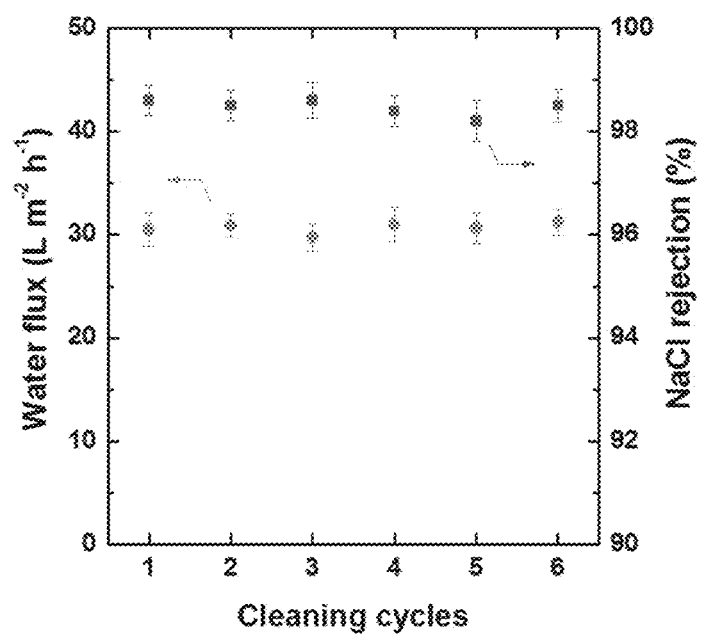
FIG. 12 is a plot illustrating the effect of chlorine cleaning cycles on water flux (● and NaCl (■) rejection of GOP-H1.0.

The effect of the repeated chlorine exposure on membrane performance of the GO-polymer membrane was investigated using 1,000 ppm NaClO aqueous solution. After being immersed in the NaClO solution for 24 h and washed with DI water, water flux and NaCl rejection of the membrane measured at 10 bar and then the GO-polymer membrane was immersed again for 24 h. After 6 cycles of the test, the GO-polymer membrane had the stable water flux and rejection properties as shown in FIG. 12. Note that chlorine exposure at 1,000 ppm is a more extreme situation than is normally encountered in commercial practice as only a few ppm of chlorine is used in RO processes. Our study demonstrates the potential long-term durability of the GO-polymer membranes for the practical RO operations.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures.

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

The invention claimed is:

1. A membrane for reverse osmosis comprising:
   (i) a porous substrate, and
   (ii) a layer adjacent the porous substrate and comprising a two dimensional nanosheet material and a crosslinked polymer, wherein the crosslinked polymer is formed from N-isopropylacrylamide and N,N'-methylenebisacrylamide.

2. The membrane according to claim 1 wherein the two dimensional nanosheet material is graphene.

3. The membrane according to claim 1 wherein the two dimensional nanosheet material is chosen from the group comprising graphene oxide including reduced graphene oxide, holey graphene, holey graphene oxide, laminated graphene oxide and holey reduced graphene oxide.

4. The membrane according to claim 1 wherein the two dimensional nanosheet material is pristine graphene oxide laminate.

5. The membrane according to claim 1 wherein the two dimensional nanosheet material is chosen from the group comprising MoS2, boron nitride, metal oxides and metal carbides.

6. The membrane according to claim 1 wherein the porous substrate is based on poly(ether sulphone) or poly sulphone.

7. The method of manufacturing the membrane of claim 1 including the steps of:
   (i) generating the porous substrate, and subsequently
   (ii) applying a solution of two dimensional nanosheet material and two monomers, wherein the two monomers are N-isopropylacrylamide and N,N'-methylenebisacrylamide, to the porous substrate,
   (iii) crosslinking the monomers to form a polymer.

8. The method according to claim 7 wherein the solution of two dimensional nanosheet material and the two monomers are applied to the porous substrate by spin coating, filtration or reduced pressure casting of the solution.

9. The method according to claim 7 wherein the two dimensional nanosheet material is graphene.

10. The method according to claim 7 wherein the two dimensional nanosheet material is chosen from the group comprising reduced graphene oxide, holey graphene, holey graphene oxide, laminated graphene oxide and holey reduced graphene oxide.

11. The method according to claim 7 wherein the two dimensional nanosheet material is pristine graphene oxide laminate.

12. The membrane according to claim 7 wherein the two dimensional nanosheet material is chosen from the group comprising MoS2, boron nitride, metal oxides and metal carbides.

13. The membrane according to claim 7 wherein the porous substrate is based on poly(ether sulphone).

14. The membrane according to claim 1 when used for reverse osmosis filtration of saline water.

15. The method of filtration comprising the step of passing a fluid through the membrane of claim 1.

16. The filtration apparatus including the membrane of claim 1.

* * * * *